H. MÜLLER.
FEEDING DEVICE FOR CUTTING MECHANISM.
APPLICATION FILED NOV. 25, 1911.
1,065,620.
Patented June 24, 1913.
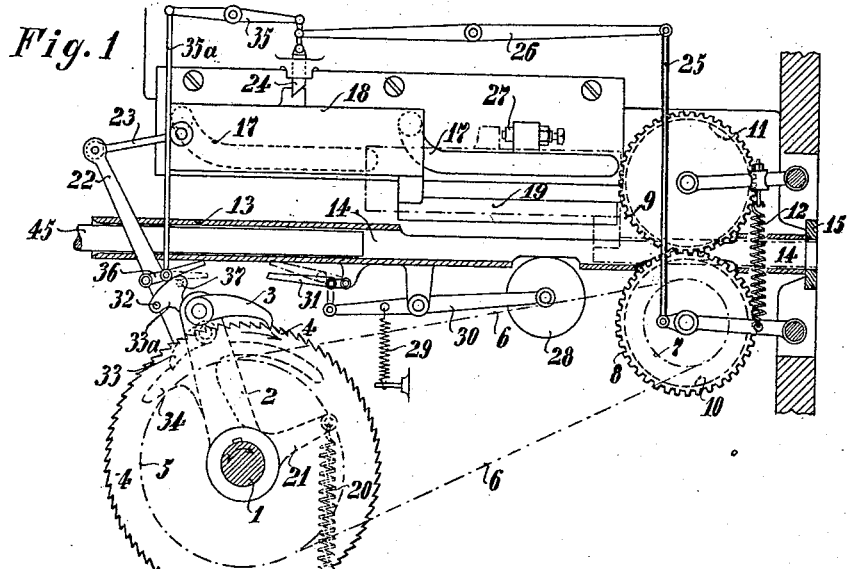
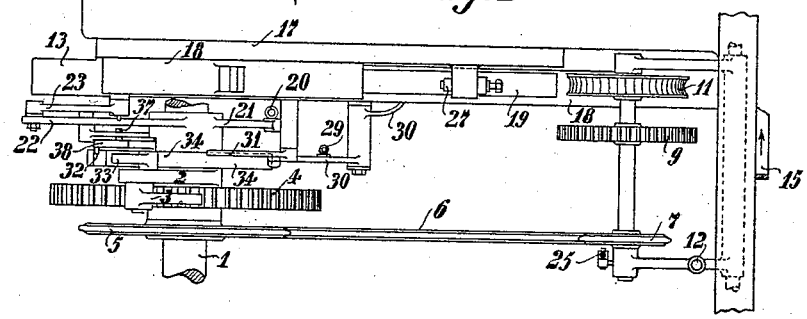
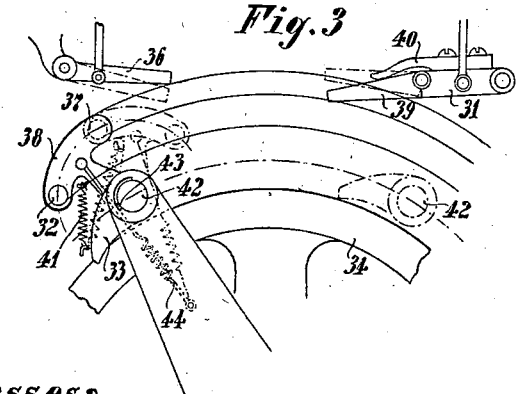
Witnesses:
Inventor:

UNITED STATES PATENT OFFICE.

HANS MÜLLER, OF HAGEN, WESTPHALIA, GERMANY.

FEEDING DEVICE FOR CUTTING MECHANISM.

1,065,620.  Specification of Letters Patent.  Patented June 24, 1913.

Application filed November 25, 1911. Serial No. 662,464.

*To all whom it may concern:*

Be it known that I, HANS MÜLLER, engineer, a citizen of the German Empire, residing at Hagen, in the Province of Westphalia, Germany, have invented certain new and useful Improvements in Feeding Devices for Cutting Mechanism, of which the following is a specification.

My invention relates to improvements in feed mechanisms for the feeding of rods into a cutting device there to be cut into pieces of uniform lengths.

The objects of my invention are, first, the prevention of remnants which are apt to remain between the feeding device and the cutter blades after having passed the former, and, second, the avoidance of the production of waste heretofore caused by the circumstance that the rod after having passed the feeding members would frequently not get into the cutting device far enough, so that pieces cut off became too small.

I attain my objects by the arrangement and disposal of parts herein described and in particular by providing a slender rod-like member or bar adapted to exert a supplementary push on the feed and thus forward the same as far through as required.

In the accompanying drawings Figure 1 represents partly a side-view and partly a vertical section of a feed mechanism operating with intermittently rotated rollers; Fig. 2 is a plan view of the said mechanism and Fig. 3 is a side-view of machine parts hereinafter referred to.

Of the cutting device only so much has been illustrated as is required for the understanding of my invention. As cutting means, shears have by way of example been shown, but I wish to be understood that I do not restrict myself to the same, as any other cutting device as, for instance, a saw, may be employed.

As shown in the accompanying drawings, there is keyed to an alternately turning shaft 1 a lever 2 carrying a ratchet-pawl 3 engaging a ratchet-wheel 4 and intermittently rotating the same, the said ratchet wheel being loosely mounted on the said shaft 1 and rigidly coupled to a sprocket-wheel 5 transmitting the intermittent rotation to another sprocket-wheel 7 and through the same to a pair of feed rollers 10 and 11 connected to each other by the gears 8 and 9. The feeding rollers 10, 11 are pressed against each other by a spring 12 and may be separated by the feed overcoming the action of the said spring, the said feed being then forwarded by the friction of the said rollers, the degree of friction being adjustable by the adjustment of the spring-action of the spring 12. A tube 13 into which the feed rollers 10, 11 extend forms the guide or passage 14 through which the feed is made to travel into the reach of the blades or cutters 15. Above the said passage there is provided a slide or carrier 18 traveling in a bayonet-guide 17 and carrying a reciprocating, sliding pusher bar 19. This bar 19 is shown on the drawing as being by the position of the slide 18 outside of the said passage 14. The said slide 18 carrying the said bar 19 may be pushed forward in its guide 17 by the action of a spring 20 and loosely turnable levers 21, 22, mounted on the said shaft 1, said lever 22 carrying a pitman or pushing bar 23. The said guide 17 is of such a shape, that, when the forward movement of the slide begins, the bar 19 is enabled to enter the feeding passage 14 from above and through a suitable slot in the tube 13 and then move forward in a straight line in the direction of the feed. The slide 18, in the position shown on the drawing, is retained by a latch 24 until the said latch is raised, when the feed entering between separates the feed rollers, such raising being effected by the action of a drawing rod 25 and a lever 26, the said drawing-rod 25 acting on the movable support-arm of the feed-roller 10. The bar 19 settles on the feed in the guide passage. As soon as the said feed has passed beneath the bar 19 the latter drops entirely into the passage and follows the feed, being acted upon by the spring 20. The cross-section of the bar 19 is about equal to that of the feed, so that the former in following the remainder of the feed is also engaged and forwarded by the feed rollers 10, 11 in the same way as the feed. The movement of the slide 18 is limited by a detent 27 so much that the forward end of the bar 19 can proceed no farther than to the cutting plane of the shear blades. When the end of the bar 19 arrives at the cutting plane the rollers 10, 11 slide on the shaft of the bar 19 until the feed or forward movement is over.

When the forward movement of the bar 19 has been finished the latter permits the insertion of a roller 28 under the action of a spring 29 into the guide passage 14, the same having previously been pressed down by the feed and the bar 19. The roller 28 is supported by a lever 30 connected with a prop 31. By the entrance of the roller 28 into the guide passage 14 the prop is brought within the swinging path of the wrist-pin 32 projecting from a lever 33ᵃ connected with a pawl 33. The said pawl 33 and lever 33ᵃ are mounted on the lever 2 keyed to the shaft 1. The pawl 33 acts in opposite direction to the ratchet-pawl 3 of the feed rollers on a sector 34 having one tooth only, rigidly connected with the moving lever 22 of the slide 18. By the prop 31 which is under the control of the roller 28 the lever 33ᵃ is thrown over and the ratchet-pawl 33 in its raised position brought in engagement with the sector 34 and by the return movement of the lever 2 following the forward movement and by the coöperative action of the lever 22 and the rod 23 retracts the slide 18 into its original position, the friction of the rollers 10 and 11 is overcome and the spring 20 at the same time is strained.

After the return movement of the slide 18 and bar 19, the latch 24 is caused to descend and engage the said slide, as shown in Fig. 1, thereby arresting the said bar in order that the latter may assume its starting position, such descent being caused by the action of spring 12 and intermediate devices, as hereinbefore described and the same being made possible by the upward movement of the lower feed roller 10 into slotted guide 14. The return pawl 33 alternates inoperatively on the sector 34 during the alternate movement of the shaft 1 until a new feed rod gets between the feed rollers 10, 11 and presses them asunder. Thereupon a second prop 36 connected by a lever 35 and a rod 35ᵃ with the latch 24 which had been retracted from the roller 10, is by the said latch brought within the swinging reach of a wrist-pin 37 projecting from the side of the pawl 33ᵃ opposite to that from which the wrist-pin 32 projects, the said wrist-pin 37 hitting the said prop 36 during the next return movement of the lever 2 and raising the pawl 33 again by throwing over the lever 33ᵃ, the pawl 33 escaping again from within the reach of the prop 31.

By the introduction of a new feed into the guide passage 14 the roller 28 has been pressed down again and the prop 31 raised again by the latter, so that the said prop 31 is retained from affecting the wrist pin 32 which by the previous throwing over of the lever 33ᵃ has come again within its reach. The forward movement of the slide 18 is thus freed again until after the arrival of the slide 18 in its end-position the roller 28 enters the guide passage 14 again and by the aid of the prop 31 prepares for the return movement.

In order to introduce the feed within the cutter blades without leaving any part uncut it is necessary that the bar 19 be not retracted until its forward end has arrived exactly before the cutting plane, for it may be possible that when an intermittent forward movement has been finished that a small distance remains between the end of the bar 19 and the cutting plane of the shears, while, on the other hand, the roller 28 has entered the guide passage 14, the return movement of the bar 19 would be started too early and a corresponding small portion would remain in the guide passage 14 and would cause disturbances. To be sure to avoid this trouble the prop 31 is, as shown in Fig. 3, so adjusted between the extreme swinging points of the pawl 33 that a portion of the swinging path is behind the point of impact of the prop 31. This portion of the swinging path within which the pawl 33 can no more be affected, should be large enough for the length of the remaining distance of the travel of the rollers 10, 11 after the entrance of the roller 28 into the passage 14 to be greater than the remaining distance of the travel of the bar 19. By this way the complete forward movement of the said bar is secured and the engagement of the pawl 33 will ensue only with the next following intermittent movement of the rollers 10, 11 gliding forward in this case on the bar 19. To prevent a disturbance of the prop 31 which has come within the swinging path of the wrist-pin 32 during the return movement of the lever 2 before the engagement of the pawl 33, the said prop is provided with a joint-piece 39, which is adapted to give way in passing the wrist pin on the return way, but recoils at once again under the action of the spring 40.

To avoid a disengagement of the pawl 33 from the sector 34 before the return movement of the slide 18 has been completed, the throwing-over-lever 33ᵃ is not rigidly connected with the said pawl, but by means of a spring 41. Together with its pivot 42 it is within certain limits marked by a key 43 secured to the pivot and engaging through an arched slot of the hub of the pawl, rotatable relative to the pawl 33 and is in all its end positions secured by a spring 44. If in the return movement of the slide 18 the wrist pin 37 hits the prop 36 only the throwing-over lever 38 rotates relative to the pawl 33, while the pawl itself remains in engagement with the sector 34 as long as it is burdened by the return movement. Only when the slide 18 has arrived again in its starting position and is engaged by the latch 24, whereby the pawl 33 becomes unburdened, the same is on the reversal of its movement disengaged from the sector 34 under the action of the spring 41.

It is clear that the employment of the device described permits of a complete feed of the rod intended to be divided into equal parts without leaving a remnant, so that there is neither a waste caused by a too short cutting off of the last piece from a rod, nor does there remain a remnant piece between the feeding and cutting devices.

I claim:—

1. In combination with a pair of spring-pressed feed rolls, a guide passage arranged to direct the feed of metal thereto, a pusher bar carried by a movable part and arranged to be introduced thereby into said passage behind the feed, guides for said movable part, means for automatically moving said bar along to a predetermined point and means for automatically withdrawing said rod, lifting it out of the said channel and restoring it to its first position, these movements being governed by said guides substantially as set forth.

2. In combination with feeding means for metal cutters, a device for following behind the feed to and through said means, a detent for preventing said device from moving forward beyond a certain point, guides for directing said device into and out of position behind the feed and forward and back in its reciprocating travel, mechanism for automatically moving said device, as governed by said guides, into and out of such position and forward and back as set forth.

3. In combination with a pair of feed rolls for cutting devices, a movable bar adapted to coöperate therewith in feeding the metal and to pass between the said rolls, a stop preventing the said bar from being moved forward too far, a tube for guiding said bar to said rolls, the said tube being slotted on top to receive said bar, guides for directing said bar down into said slot and up out of the same, means for automatically moving said bar down into said tube and forward in the same and means for automatically moving said bar back through the tube and into its first position.

4. In combination with feeding means for cutting devices, an auxiliary pusher bar for the feed, a tube leading to said feeding means having a slot on top to admit said bar and an opening underneath, a carrier for said bar, guides for said carrier directing said bar through said slot alternately into and out of position behind the feed, a device entering said opening to receive the impact of said bar on its return movement and to be forced outward thereby, a movable catch for the said bar in its inoperative position, intervening connections whereby said catch is operated by the outward movement of said device and means for automatically reciprocating said bar substantially as set forth.

5. A pair of spring pressed feeding rolls for cutters and mechanism for intermittently operating the same, in combination with a pusher bar adapted to pass in between said rolls behind the feed and complete the feeding movement, a stop for preventing said bar from moving too far forward, a guide-passage directing the feed and pusher bar to said rolls, a reciprocating slide carrying said bar, guides for said slide directing said bar into said channel in its forward movement and out of the same in its return movement, mechanism for moving said slide and bar forward, mechanism for moving said slide and bar backward, a device automatically introduced into the said passage as said bar passes forward beyond it, mechanism for effecting the rearward movement of said bar and connections from said inserted device to such return-actuating mechanism whereby such insertion brings said mechanism into operative position.

6. In combination with a reciprocating pusher bar, a passage in which it slides after the feed and which is provided with an opening, a part adapted to automatically enter said opening when said bar passes beyond it, return mechanism for said bar thrown into operative position by such entering movement, mechanism for automatically moving said bar forward and guides for directing said bar alternately into and out of the path of the feed during its reciprocation.

7. In combination with a reciprocating pusher bar for feeding metal to cutters, a passage in which it travels forward and back and which is provided with an opening, a movable part adapted to enter said opening behind said bar and to be forced out by the return of the latter, a movable catch for the said bar in its rearmost position, means set in operation by said entering movement for permitting the action of said catch, automatic mechanism for feeding said bar forward, automatic mechanism for feeding said bar backward and guides for directing the movements of said bar substantially as set forth.

In testimony whereof, I have signed my name to this specification in the presence of two subscribing witnesses.

HANS MÜLLER. [L. S.]

Witnesses:
  ALBERT F. NUFER,
  HELEN NUFER.

---

Copies of this patent may be obtained for five cents each, by addressing the "Commissioner of Patents, Washington, D. C."